United States Patent [19]
Hicks

[11] Patent Number: 6,012,378
[45] Date of Patent: Jan. 11, 2000

[54] AIR BRAKE ACTUATOR HAVING INCREASED OUTPUT

[75] Inventor: William J. Hicks, Muskegon, Mich.

[73] Assignee: Neway Anchorlok International, Inc., Muskegon, Mich.

[21] Appl. No.: 08/915,050

[22] Filed: Aug. 20, 1997

Related U.S. Application Data

[63] Continuation of application No. PCT/US97/03002, Feb. 27, 1997.
[60] Provisional application No. 60/013,267, Mar. 12, 1996.

[51] Int. Cl.⁷ ........................................... F01B 7/00
[52] U.S. Cl. .................................. 92/63; 92/6 D
[58] Field of Search ........................... 92/6 D, 63, 98 R, 92/98 D

[56] References Cited

U.S. PATENT DOCUMENTS

| | | | |
|---|---|---|---|
| 2,950,739 | 8/1960 | Lofink | 92/6 D |
| 3,613,513 | 10/1971 | Johnson . | |
| 4,098,285 | 7/1978 | Karing | 137/117 |
| 4,215,625 | 8/1980 | Hoffmann et al. | 92/6 D |
| 4,426,915 | 1/1984 | Maucher et al. . | |
| 5,105,727 | 4/1992 | Bowyer . | |

FOREIGN PATENT DOCUMENTS

| | | |
|---|---|---|
| 0 219 613 | 7/1986 | European Pat. Off. . |
| 0 576 978 A1 | 6/1993 | European Pat. Off. . |
| 31 45 756 A1 | 5/1983 | Germany . |
| 3145-757 | 5/1983 | Germany . |
| 88 14 931 U | 11/1988 | Germany . |
| 39 25 076 A1 | 1/1991 | Germany . |
| 1005555 | 9/1965 | United Kingdom . |
| WO 94/29573 | 12/1994 | WIPO . |

*Primary Examiner*—Thomas E. Denion
*Attorney, Agent, or Firm*—Rader, Fishman, Grauer & McGarry

[57] ABSTRACT

A spring brake actuator (14) includes a housing having first (51) and second (52) housing sections defining a housing interior (53). A support plate (70) is movable between retracted and extended positions relative to the housing and a spring (72) is disposed between the second housing section and a first surface of the support plate for biasing the support plate to the extended position. An actuator rod (60) is operably connected to the support plate (70) at a first end for reciprocal movement with the support plate. Another end of the actuator rod extends through an aperture (64) in the first housing section (51). A flexible diaphragm (358) abuts a second surface of the support plate opposite the first surface and divides the interior of the housing into a first chamber and a second chamber. A surface of the diaphragm is exposed to fluid pressure to thereby force the support plate (70) to the retracted position against the bias of the spring (72). The diaphragm includes an elongate portion that forms a loop (360) when the support plate is in the retracted position to thereby increase the effective surface area over which the fluid pressure acts as the support plate (70) moves from the extended position to the retracted position. A service brake actuator (12) may be in tandem with the spring brake actuator (14). The service brake actuator includes a housing and a second movable diaphragm within the housing that divides the interior of the housing into first and second service brake chambers. The diaphragm (132) has an elongate portion that forms a loop when a push rod (18) in the service brake actuator housing is in the extended position to increase the effective surface area over which the fluid pressure acts as the push rod (18) moves from the retracted position to the extended position and thereby increase the braking force of the service brake actuator.

30 Claims, 8 Drawing Sheets

AIR BRAKE ACTUATOR HAVING INCREASED OUTPUT

This application is a continuation of PCT/US97/03002, filed Feb. 27, 1997. This application claims benefit of Provisional Application 60/013267 filed Mar. 12, 1996.

BACKGROUND OF THE INVENTION

1. Field of the Invention

The invention relates to air-operated diaphragm brakes for vehicles and, more particularly, to tandem service and emergency brake actuator assemblies having increased braking output and decreased hold off pressure requirements in the emergency brake.

2. State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and an emergency brake actuator which causes actuation of the brakes when air pressure has been released. The emergency brake actuator includes a strong compression spring which forces application of the brake when air is released. This is often referred to as the spring brake actuator. Typically, the spring brake actuator is disposed in tandem with the service brake actuator. When full pressure is applied to the emergency brake actuator, air pressure acting against a diaphragm compresses the spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the emergency brake spring acting on the spring brake actuator rod which in turn acts upon the service brake push rod to apply the brakes. Thus, the spring brake portion serves both as a parking brake and an emergency brake.

A typical brake actuator has a certain range of braking effectiveness, which is defined by the effective stroke length of the service brake push rod. This braking effectiveness is reduced as the push rod moves beyond its effective stroke length and approaches its limit of travel. As the service brake push rod reaches its limit of travel when the brakes are applied, the force at which the push rod moves outwardly is reduced since the effective area over which the air pressure acts is reduced in the service brake housing.

A typical actuator may have an effective area of 30 square inches in the service brake housing at the beginning of the rod stroke. This effective area is directly related to the size of the diaphragm and the size of the pressure plate adjacent to the diaphragm in the service brake housing. A constant air pressure acts across the entire diaphragm, including the portion not supported by the pressure plate. The service brake push rod itself is designed typically to have a working stroke length of 0 to 2½ inches, where 0 to 1½ or 2 inches is the effective stroke length. As the rod is extended through the effective stroke length, the effective area may decrease slightly or remain constant. As long as the effective area remains constant, the force on the rod to actuate the brakes also remains constant, since the force is equal to the effective area multiplied by the constant air pressure. At the end of its effective stroke length, the diaphragm becomes rounded at the pressure plate, thus reducing the effective area against which the air pressure acts. The lower portion of the housing itself may be canted inward, thus restricting diaphragm movement and leading to an even greater reduction in the effective area. Consequently, as the rod passes from the 1½ or 2 inch stroke to its fully extended position at 2½ inches, the braking force decreases.

In one prior art actuator, the effective area can be reduced to as little as 22 square inches. For a typical air pressure of 15 psi when the brakes are applied, the brake force ranges from 450 lbf (pounds-force) over the effective stroke length with an effective area of 30 square inches, to 330 lbf beyond the effective stroke length, when the effective area is reduced to 22 square inches. This sharp reduction in braking force ordinarily does not pose a problem when the rod is within its effective stroke length. However, when the brakes are at the end of their service life or improperly maintained or adjusted, the rod must travel beyond its effective stroke length to apply the brakes. This pertains as well when the brakes become overheated due to constant use, such as when descending long grades. The brake drums may heat up and expand due to friction between the brake shoes and drums. Consequently, a longer stroke is required to apply the brakes. The operator typically pushes harder on the pedal expecting the braking effectiveness or the force on the brakes to increase. However, just the opposite happens. As the rod passes its effective stroke length, the braking effectiveness actually decreases. Thus, less braking action is accomplished as the operator pushes further on the pedal.

Another problem associated with the air brake actuator occurs in the spring brake housing. Typically, the spring brake housing has an actuator rod aligned with the push rod in the service brake housing. One end of the actuator rod terminates in a reaction plate which abuts against the push rod. The other end of the actuator rod terminates in a pressure plate which engages a spring brake compression spring. A diaphragm abuts the pressure plate and sealingly divides the spring brake housing into an upper spring chamber and lower air chamber. The air chamber is filled with compressed air supplied through an air service port when the emergency brake is in its normally released position. Although the required amount of air pressure may vary depending on the particular design, a pressure such as 100 psi is typical. As in the service brake chamber, the diaphragm and pressure plate in the spring brake chamber define an effective area against which the air pressure acts, i.e., a typical effective area could be 30 square inches, which, together with a constant pressure of 100 psi, would result in a force of 3,000 lbf to keep the compression spring retracted. When a leak occurs in the air pressure system, it is difficult to maintain the required constant pressure.

Consequently, the compression spring advances against the lower air pressure until an equilibrium state is reached between the spring and the air chamber. The actuator rod is simultaneously pressed against the push rod in the service brake housing, and may extend the push rod far enough to cause the brake shoes to drag against the drums, a situation with potentially serious consequences. At the very least, the brake shoes and drums are subject to faster wear, leading to shorter service intervals and increased costs due to parts, labor, and down time. Furthermore, the high pressure that must be maintained in the spring brake housing results in large air reservoirs and air compressors, which contribute to increased overall cost of the braking system.

SUMMARY OF THE INVENTION

These and other disadvantages of the prior art are overcome by the provision of a brake actuating assembly having a greater effective surface area at the end of the push rod stroke and/or at the beginning of the actuator rod stroke over which the air pressure acts to provide a greater braking force as the push rod approaches its limit of travel, and/or to provide a greater resistance to the force of the compression spring when the actuator rod is in the retracted position in accordance with the present invention.

In accordance with one aspect of the invention, a spring brake actuator includes a housing having first and second housing sections defining a housing interior. A support plate is movable between retracted and extended positions relative to the housing and a spring is disposed between the second housing section and a first surface of the support plate for biasing the support plate to the extended position. An actuator rod is operably connected to the support plate for reciprocal movement relative to the housing. A first end of the actuator rod extends into an aperture in the first housing section. A flexible diaphragm abuts a second surface of the support plate opposite the first surface and divides the interior of the housing into a first chamber and a second chamber. A surface of the diaphragm is exposed to fluid pressure to thereby force the support plate to the retracted position against the bias of the spring. Preferably, the diaphragm includes an elongate portion that forms a loop when the support plate is in the retracted position to thereby increase the effective surface area over which the fluid pressure acts as the support plate moves from the extended position to the retracted position.

In one embodiment, the elongate portion of the diaphragm is located between a peripheral edge and a center section of the diaphragm.

In another embodiment, the elongate portion of the diaphragm forms part of the center section. The center section is dome-shaped before installation of the diaphragm in the housing and the center section is pushed against the support plate by the actuator rod when installed in the housing to form the loop adjacent to the center section.

According to a further aspect of the invention, the second housing section includes an inner circumferentially extending channel that is adapted to receive at least a portion of the loop when the support plate is in a retracted position and fluid pressure is acting against the diaphragm.

In a further embodiment, a brake actuator for a vehicle has a service brake actuator housing and a spring brake actuator housing, each with an interior space. A first movable diaphragm is disposed within the spring brake actuator housing dividing the interior space thereof into a first spring brake actuator chamber and a second spring brake actuator chamber, while a second movable diaphragm is disposed within the service brake actuator housing dividing the interior space thereof into a first service brake actuator chamber and a second service brake actuator chamber. An actuator rod is operably connected to the first movable diaphragm for reciprocal movement therewith between a first retracted position wherein the actuator rod is essentially within the interior space of the spring brake actuator housing and a second extended position wherein the actuator rod extends into the interior space of the service brake actuator housing. The first movable diaphragm includes an elongate portion that forms a loop when the actuator rod is in the extended position to thereby increase the effective surface area over which the fluid pressure acts as the actuator rod moves from the extended position to the retracted position.

In an even further embodiment, the second movable diaphragm includes an elongate portion that forms a loop when a push rod in the service brake actuator housing is in the extended position to thereby increase the effective surface area over which the fluid pressure acts as the push rod moves from the retracted position to the extended position.

DETAILED DESCRIPTION OF THE PREFERRED EMBODIMENT

Figure 1:
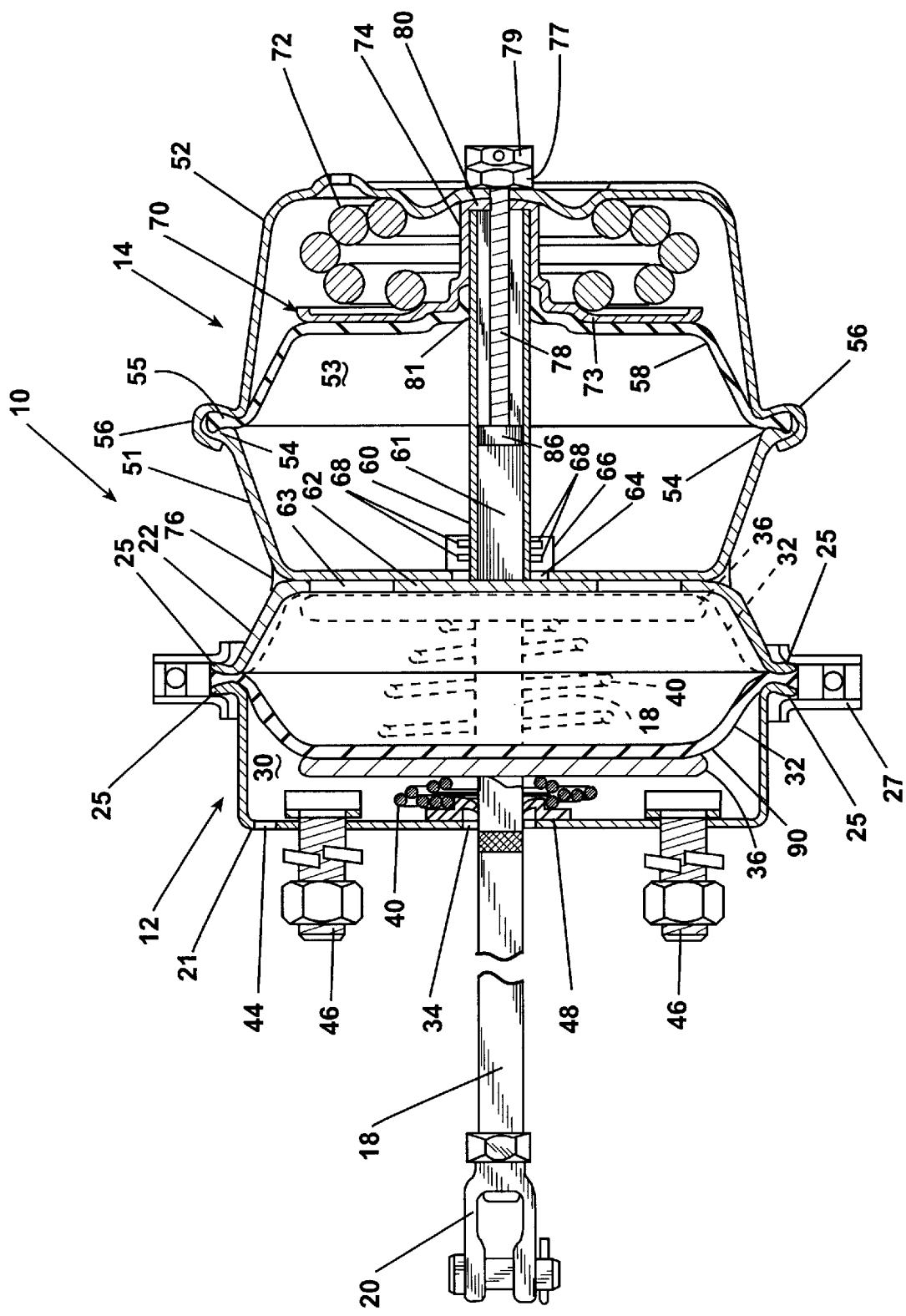
FIG. 1 is a cross-sectional view of a prior art air-operated brake actuating assembly showing the service brake push rod and diaphragm in its initial (in phantom) and extended positions.

FIG. 1 shows a cross-sectional view of a prior art air-operated brake actuating unit 10 having a general configuration well known in the art. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flanged edge 25. The housing sections 21 and 22 are clamped together at their flanged edges by means of a clamp 27 to form a service brake inner chamber 30. An elastomeric cup-shaped diaphragm 32 (shown non-inverted in dashed line) is suspended within the inner chamber 30 and is compressed at the peripheral edge thereof between flanged edges 25 of the housing sections 21 and 22. The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 48 is disposed around the central opening 34 to receive the end of the compression spring 40 and retain it in position around the opening 34. The spring 40 thus urges the pressure plate 36 and the service brake push rod 18 to a fully retracted position as depicted in dashed lines in FIG. 1. Mounting studs 46 are provided to mount the brake actuating unit 10 onto a brake assembly.

The spring brake 14 comprises a pair of facing cup-shaped housing sections 51 and 52 joined at their edges to form an inner chamber 53. Housing section 51 is provided with an outwardly directed circumferential flanged edge 54. The housing sections 51 and 52 are clamped together by means of a peripheral curved edge 56 on housing section 52 engaging edge 54 on housing section 51. An elastomeric inverted cup-shaped diaphragm 58 is suspended within the spring brake chamber 53 and is compressed at its peripheral edge 55 between the edges 54 and 56 of housing sections 51 and 52, respectively. The portion of the chamber 53 between the diaphragm 58 and housing section 51 forms an air chamber which is filled with compressed air supplied through an air service port in housing section 51 (not shown in the drawing) when the emergency brake is in its normally released position. An actuator rod 60, aligned with push rod 18, has one end extending through a central opening 64 in an end wall of housing section 51. The one end of actuator rod 60 terminates in a reaction plate 62 disposed in an aligned central opening 63 in an end wall of housing section 22. Opening 64 is provided with a bearing 66 having annular recesses to accommodate a pair of O-ring seals 68. Bearing 66 forms a bearing surface and an airtight seal for actuator rod 60. The other end of actuator rod 60 extends through a centrally disposed aperture 81 in the diaphragm 58 and terminates in a pressure plate 70 which engages spring brake compression spring 72. The pressure plate 70 comprises a substantially flat portion 73 engaging one end of spring 72 and a tubular portion 74 extending generally axially along the axis of spring 72. The tubular portion 74 is press-fit onto an end portion of actuator rod 60 such that the pressure plate 70 and the rod 60 form an integral unit. The pressure plate 70 may be formed of cast aluminum. The actuator rod 60 may be a hollow tube or rod provided with a central bore 61 to accommodate a brake release or caging rod or tool 78. The tool 78 is adapted to engage an end edge 80 of the tubular portion 74 of pressure plate 70 to maintain the spring 72 in a compressed position whenever such is desired. The tool may be used to manually release the spring brake or to ensure that the compression spring 72 will remain compressed when maintenance functions are performed on the brake assembly. The tool 78 may be a threaded bolt or the like engaging a fixed threaded opening or a nut 77 affixed by welding to the end wall of housing section 52. A second nut or head 79 is fixedly attached to the threaded bolt such that the bolt may be rotated in nut 77 by a common wrench or the like. A plate 86 engages the edge 80 when the tool 78 is withdrawn to retain the compression spring 72 in its compressed state. Operation of the spring brake 14 is described in U.S. Pat. No. 5,105,727 which is herein incorporated by reference.

Figure 2:
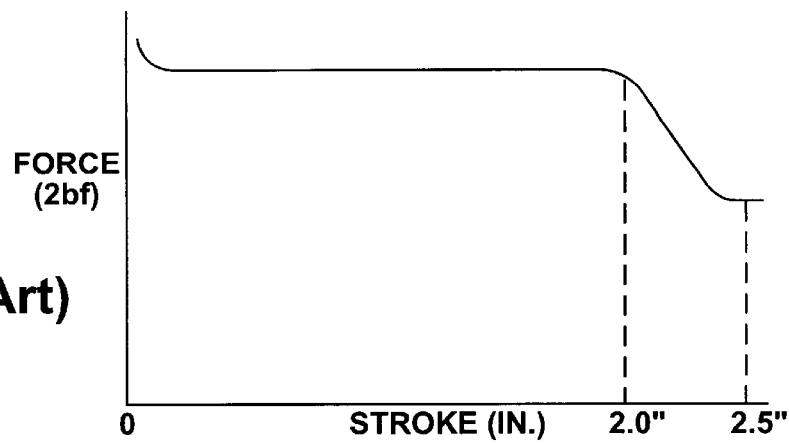
FIG. 2 shows the service brake force-stroke curve of the prior art brake actuating assembly.

Typical service brake operation includes introducing compressed air through an air service port in housing section 22 (not shown in the drawing) into chamber 30 to force the diaphragm 32 and pressure plate 36 against the force of spring 40 to actuate the push rod 18. Openings 44 are provided in the housing section 21 to allow for the rapid evacuation of air from the inner chamber 30. As the push rod approaches its effective stroke length, the initially non-inverted cup-shaped diaphragm (shown in dashed line) becomes inverted (shown in solid line). As the push rod continues past its effective stroke length, the diaphragm loses its cup shape while a portion 90 of the diaphragm adjacent to the pressure plate becomes rounded, thereby reducing the effective area over which the air pressure can act. In order to obtain the greatest force over the effective area, the air pressure must bear against the diaphragm in a direction parallel to the push rod movement. However, because of the deformation that occurs in the diaphragm, air pressure bears against the diaphragm portion 90 in a direction nonparallel to the push rod movement. Consequently, as the rod passes from its effective stroke length to its fully extended position, the braking force significantly decreases. As shown in the force-stroke curve of FIG. 2, a typical effective rod stroke range is from 0 to 2 inches. The brake force (expressed in pounds-force) is substantially linear over this range. As the push rod passes beyond its effective stroke length, a sharp decrease in the brake force occurs. As previously noted, in one prior art actuator, the brake force may range from 450 lbf over the effective stroke length to 330 lbf beyond the effective stroke length.

Figure 3:
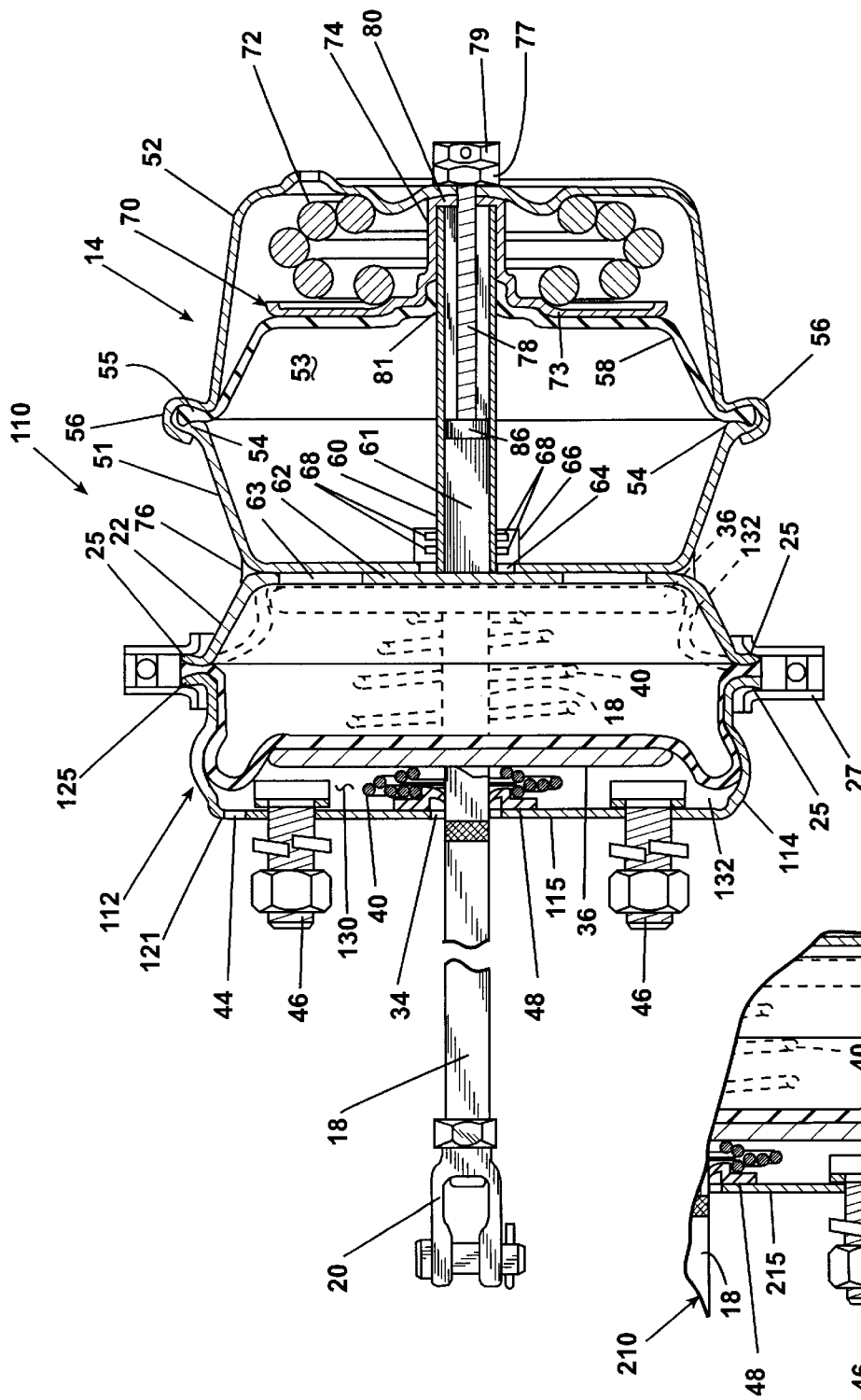
FIG. 3 is a cross-sectional view of an air-operated brake actuating assembly according to the present invention showing the service brake push rod and diaphragm in its initial (in phantom) and extended positions.

Referring now to FIG. 3, an air brake actuator 110 according to the present invention is shown, wherein like parts in FIG. 1 are represented by like numerals. A service brake 112 comprises a pair of facing cup-shaped housing sections 121 and 22, each having an outwardly directed flanged edge 125 and 25, respectively. The housing sections 121 and 22 are clamped together at their flanged edges by means of a clamp 27 to form a service brake inner chamber 130. In order to increase the braking effectiveness, according to one aspect of the present invention, the housing section 121 includes an inner channel 114 extending circumferentially therearound. The channel 114 forms part of the inner chamber 130, and appears as a bulge on the outside of section 121. In a preferred embodiment, channel 114 is spaced axially from lower wall 115 of housing section 121. An elongated elastomeric diaphragm 132 is suspended within the inner chamber 130, and is compressed at the peripheral edge thereof between flanged edges 125, 25 of the housing sections 121 and 22. The diaphragm drapes downward when the push rod 18, pressure plate 36, and spring 40 are in their initial position as shown in dashed line. When compressed air is introduced through an air service port in housing section 22 (not shown in the drawing), the diaphragm 132 and pressure plate 36 are pushed against the force of spring 40 to actuate the push rod 18. As the push rod approaches its maximum stroke length, the compressed air causes the diaphragm to fill channel 114 thereby creating a greater surface area over which the air pressure can effectively act. The final effective area is at least equal to and preferably greater than the initial effective area. Since the air pressure is constant, the braking force transmitted through the push rod remains the same or increases throughout the entire push rod range of movement.

Figure 5:
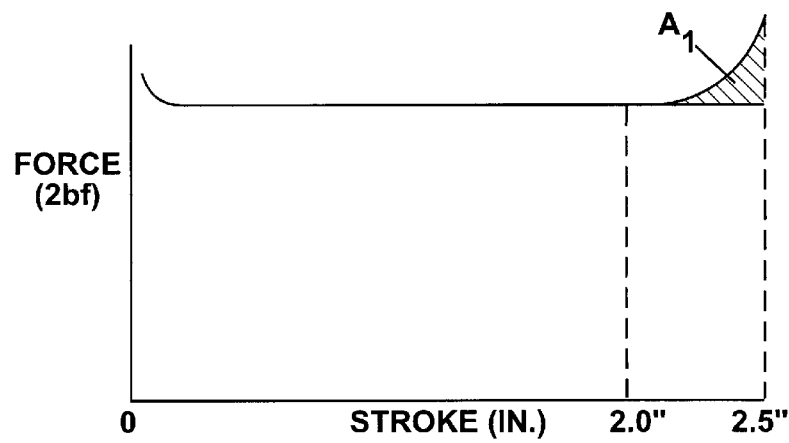
FIG. 5 shows the force-stroke curve of the actuating assembly of FIGS. 3 and 4 according to the present invention.

As shown by the force-stroke curve of FIG. 5, an actuator according to the present invention having for example an effective rod stroke range from 0 to 2 inches exhibits a substantially linear brake force. However, as the push rod passes beyond its effective stroke length, a sharp increase in the brake force occurs, as shown by area $A_1$. Thus, a greater braking force is provided when it is needed most. A smaller service brake chamber could consequently be used since no loss of brake force occurs throughout the entire movement of the push rod. Indeed, a shorter stroke is now possible because the invention affords maximum force throughout the entire stroke length. With a shorter effective stroke length, the same braking force is available from a smaller housing with a consequent savings in space and cost.

Figure 4:
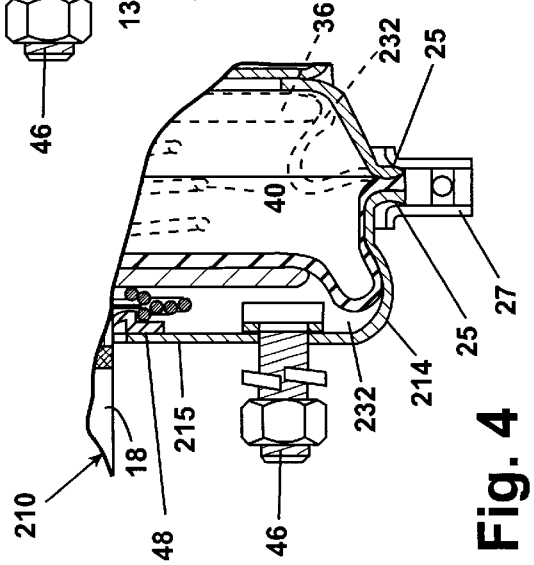
FIG. 4 is an enlarged partial cross-sectional view of a lower service brake housing according to a second embodiment of the invention.

Referring now to FIG. 4, a portion of an air brake actuator 210 according to a further embodiment of the invention is shown, wherein like numerals in the previous embodiment are used to identify like parts. A service brake housing 212 includes a lower housing section 221 having an inner channel 214 extending circumferentially therearound. The channel 214 appears as a bulge on the outside of section 221, and extends from the lower wall 215 of the housing section 221 to a position spaced from the lower wall. In contrast to the previous embodiment, the channel 214 is at the lower wall 215. A diaphragm 232 drapes downward when the push rod 18, pressure plate 36, and spring 40 are in their initial position as shown in dashed line. When compressed air is introduced through an air service port in housing section 22 (not shown in the drawing), the diaphragm 232 and pressure plate 36 are pushed against the force of spring 40 to actuate the push rod 18. As the push rod approaches its maximum stroke length, the compressed air causes the diaphragm to partially fill the channel, thereby creating a greater surface area over which the air pressure can efficiently act. As in the previous embodiment, the final effective area is at least equal to and preferably greater than the initial effective area. Since the air pressure is constant, the braking force transmitted through the push rod remains constant or increases throughout the entire push rod range of movement, as earlier described.

Although the elongated diaphragm has been described for use with the circumferentially extending channel, it is contemplated that in some instances the channel is unnecessary. An enlarged diaphragm alone would provide a greater effective area at the push rod extended position than the prior art.

Figure 6:
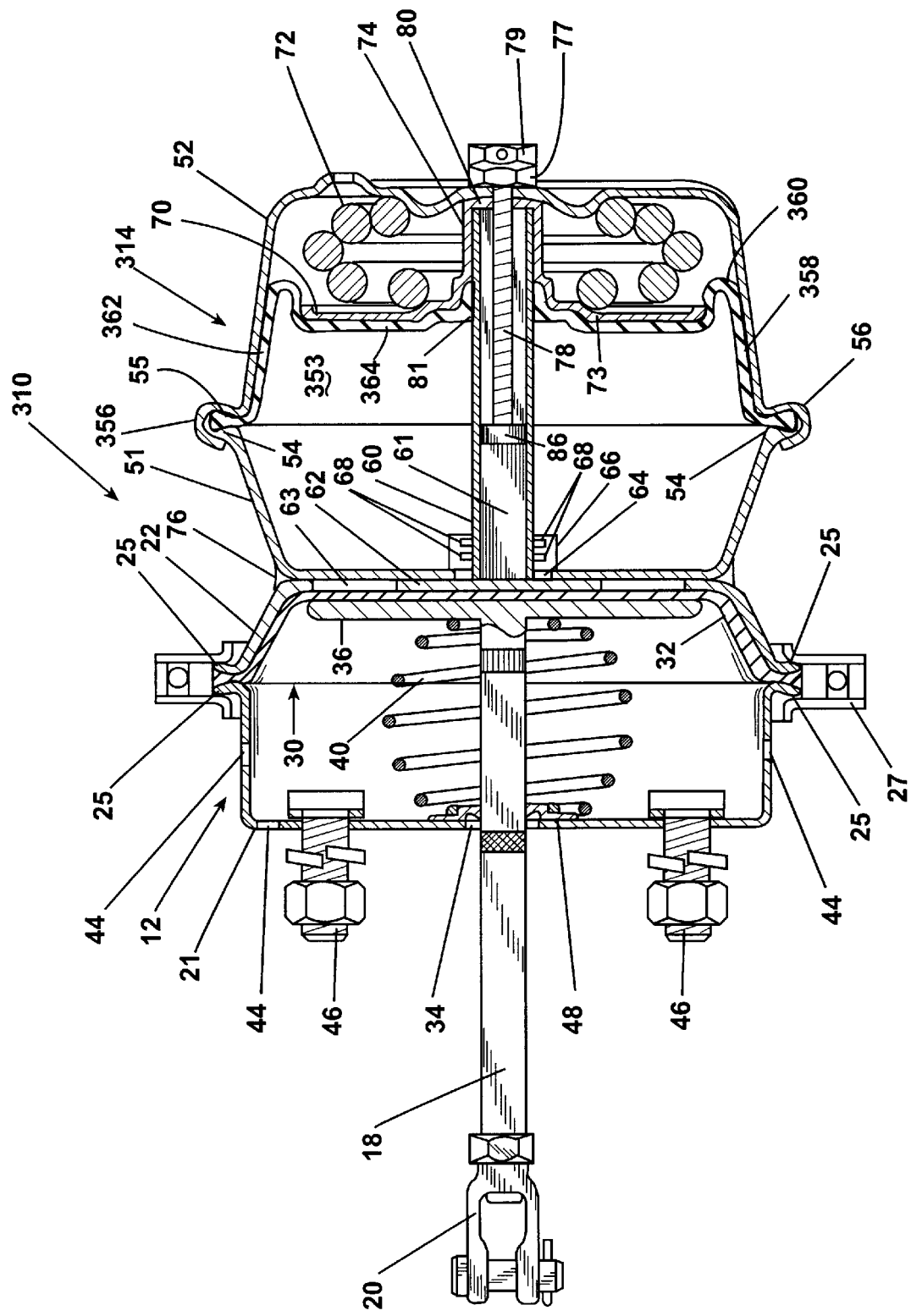
FIG. 6 is a cross-sectional view of an air-operated brake actuating assembly showing a modified diaphragm in the spring brake housing according to a further aspect of the present invention.
Figure 8:
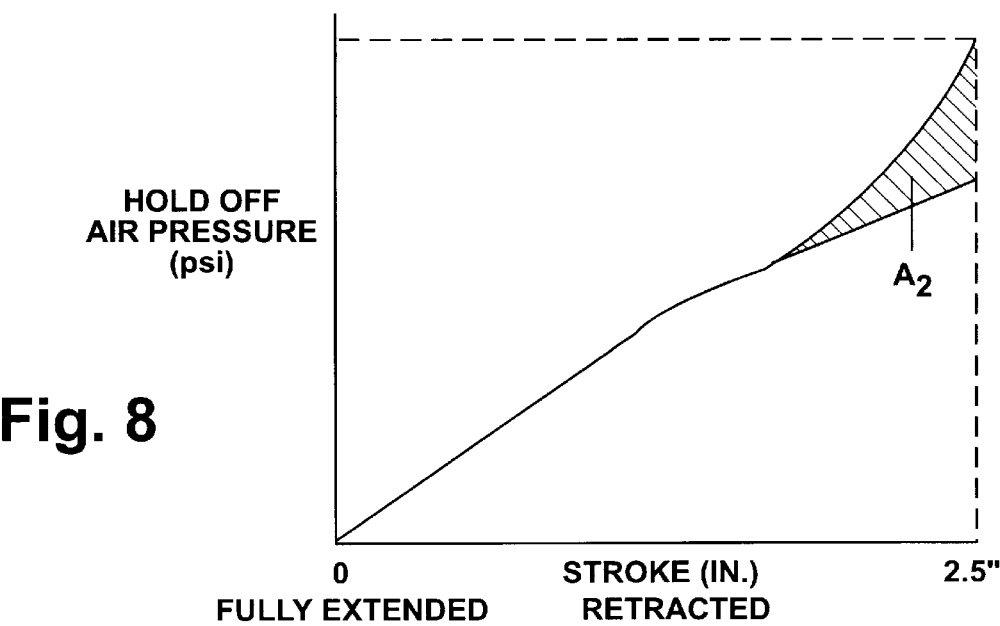
FIG. 8 shows the hold-off air pressure curve of the actuating assembly of FIGS. 6 and 7.

Referring now to FIG. 6, an air brake actuator 310 according to another embodiment of the invention is shown, wherein like parts in FIG. 1 are represented by like numerals. The spring brake 314 is similar to the spring brake 14 previously described, with the exception of an enlarged elastomeric inverted cup-shaped diaphragm 358. The diaphragm 358 is suspended within the spring brake chamber 53 and is clamped at its peripheral edge 55 between the edges 54 and 56 of housing sections 51 and 52, respectively. The portion of the chamber 53 between the diaphragm 58 and housing section 51 forms an air chamber which is filled with compressed air supplied through an air service port in housing section 51 (not shown in the drawing) when the emergency brake is in its normally released position. The diaphragm 358 includes a peripheral wall 362 that extends between the peripheral edge 55 and a circumferentially extending loop portion 360. A pressure plate engagement portion 364 extends inwardly from the loop portion 360 toward the actuator rod 60. The circumferentially extending loop portion 360 increases the effective area over which the air pressure acts. Ideally, the circumferentially extending wall of the housing section 52 should be cylindrical, but may be tapered as shown. Since the air pressure is constant, the increase in effective area results in a greater force applied against the spring 72 as denoted by area $A_2$ in FIG. 8. Alternatively, a reduction in air pressure can hold the spring 72 in its retracted position. In the present example, the stroke in inches as shown in FIG. 8 represents the spring 72 between the fully extended position (stroke equals zero) and the fully retracted position (stroke equals 2.5 inches). The augmented force, as represented by the solid line indicating an increase in hold-off pressure, may be considered advantageous as a safety feature, such as when leaks occur in the pressurized air system, to maintain the spring 72 in its retracted position, thus avoiding brake dragging and its associated problems. This augmented force means also that the hold off pressure, represented by the dotted line in FIG. 8, necessary to maintain the spring 72 in its retracted position need not be as much as the prior art dictated. Conversely, a stronger spring 72 can be used for more braking force when needed. With the structure shown in FIG. 6, it has been found in laboratory testing that the spring 72 remained in its retracted position even with a 15 to 27 percent reduction in air pressure, depending on the type of spring brake. Instead of a typical air pressure of 100 psi in the spring brake chamber of prior art actuators, the oversized diaphragm according to the present invention requires approximately only 80 psi for an equivalent actuator to maintain the actuator rod 60 in the fully retracted position. With this significant reduction in required air pressure, a stronger spring 72 can be used with the current compressor and holding tank to apply greater holding force when the parking brake is set. Alternatively, a smaller air compressor and holding tank can be used to decrease the air pressure, thus leading to cost savings in the air brake system.

Figure 7:
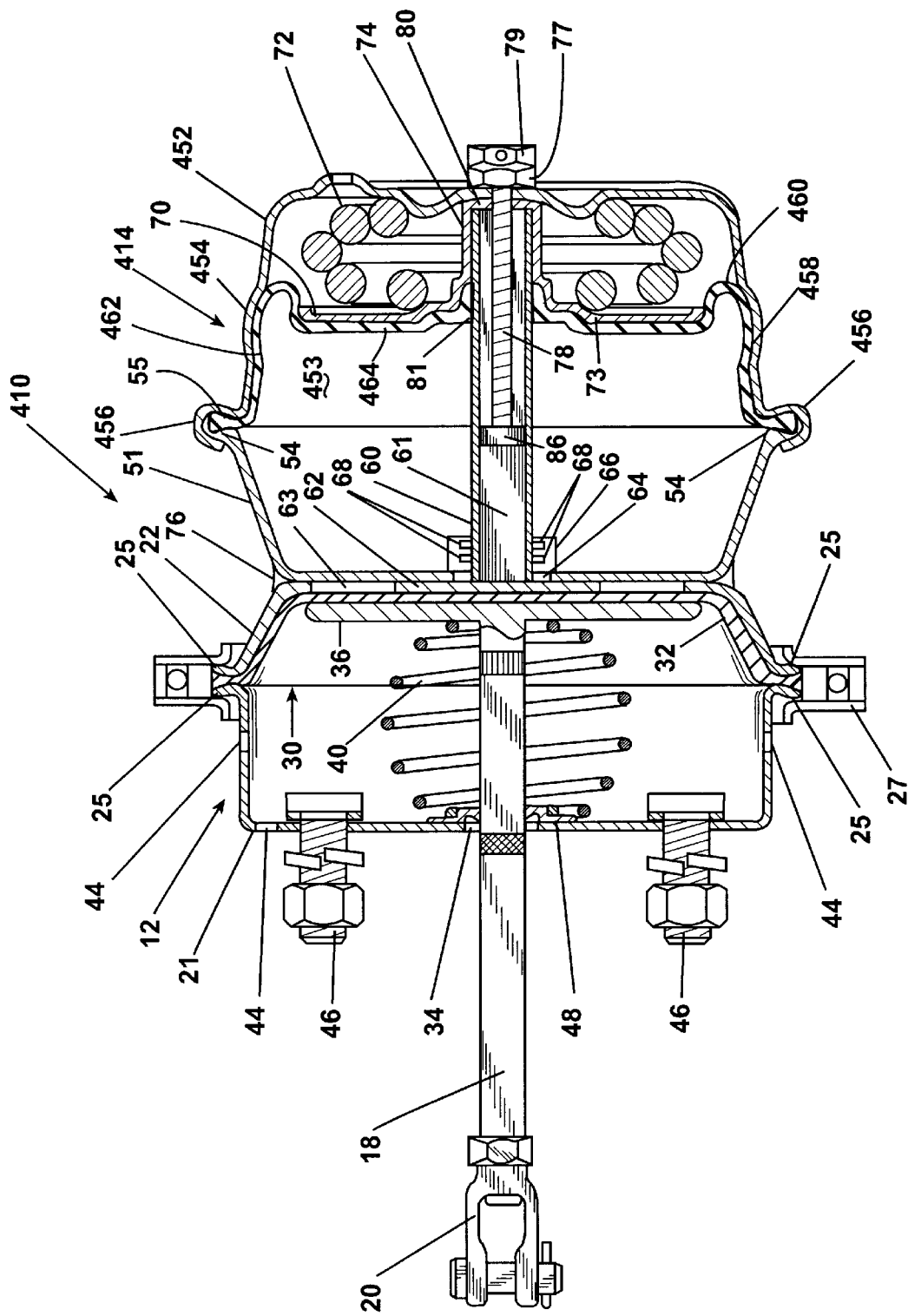
FIG. 7 is a cross-sectional view of an air-operated brake actuating assembly showing a modified diaphragm and spring brake housing according to an even further aspect of the present invention.

Turning now to FIG. 7, an air brake actuator 410 according to another embodiment of the invention is shown, wherein like parts in the previous embodiments are represented by like numerals. A spring brake 414 comprises a pair of facing cup-shaped housing sections 51 and 452 joined at their edges to form an inner chamber 453. The housing sections 51 and 452 are clamped together by means of a peripheral curved edge 456 on housing section 452 wrapped around edge 54 on housing section 51. The housing section 452 includes a circumferentially extending channel 454 that appears as a bulge on the outside of housing section 452. An enlarged elastomeric inverted cup-shaped diaphragm 458 is suspended within the spring brake chamber 453 and is compressed at its peripheral edge between the edges 54 and 456 of housing sections 51 and 452, respectively. The portion of the chamber 453 between the diaphragm 458 and housing section 51 forms an air chamber which is filled with compressed air supplied through an air service port in housing section 51 (not shown in the drawing) when the emergency brake is in its normally released position. Because of its size, diaphragm 458 includes a circumferentially extending loop portion 460 and a peripheral wall 462 that extends between the peripheral edge 55 and the loop portion 460. A pressure plate engagement portion 464 extends inwardly from the loop portion 460 toward the actuator rod 60. The diaphragm 458 fills the channel 454 when compressed air is supplied to the air chamber. The combination of the enlarged diaphragm and channel in spring brake 414 increases the effective area over which the air pressure acts. Since the air pressure is constant, the increase in effective area results in a greater force applied against the spring 72, when the spring is in the fully retracted position. As in the previous embodiment, the increased force can be used to counteract the force of a stronger spring, or the force may alternatively be reduced through a reduction in air pressure, resulting in cost savings to the air brake system.

Figure 9:
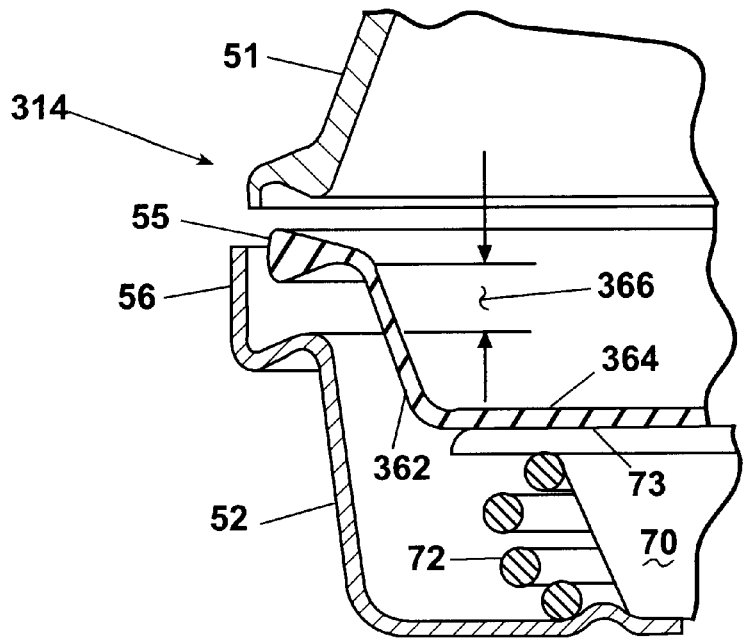
FIGS. 9, 10 and 11 illustrate a first method of assembling a spring brake actuator with an enlarged diaphragm according to the invention.
Figure 10:
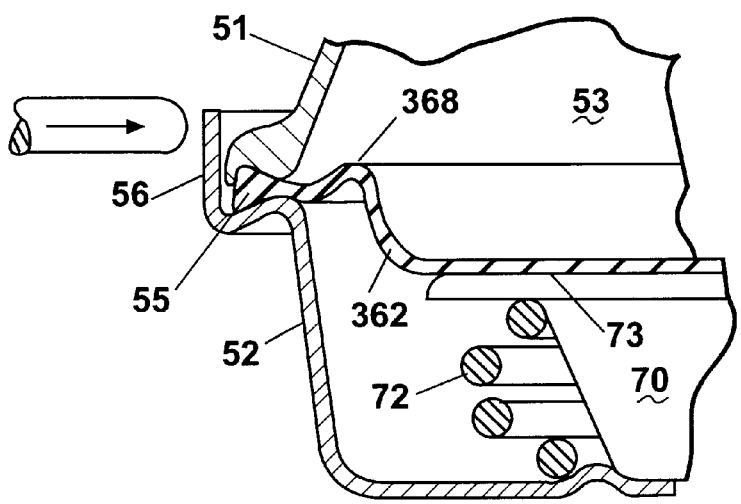
Figure 11:
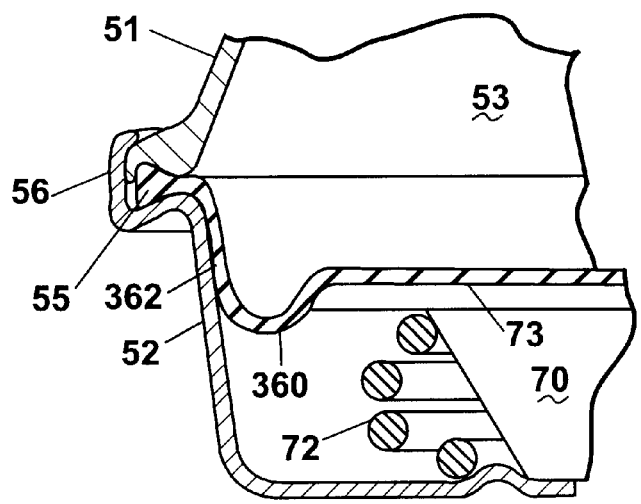

With reference now to FIGS. 9–11, an alternate construction and method of assembling the spring brake 314 of FIG.

6 will now be described, wherein like parts in the previous embodiments are represented by like numerals, it being understood that the same description can apply to the spring brake assembly 414 of FIG. 7. As an alternative to the diaphragm 358 being molded with a loop portion 360, the peripheral wall 362 may be formed longer than the prior art peripheral wall. The wall 362 extends between the peripheral edge 55 and the pressure plate engagement portion 364. A center of the engagement portion 364 may be solid or formed with an aperture (not shown), depending on the type of spring brake being assembled.

During assembly, the engagement portion 364 is positioned on the flat portion 73 of the pressure plate 70 in the housing section 52. Due to the length of the wall 362, a gap 366 exists between the peripheral edge 55 of the diaphragm 358 and the peripheral curved edge 56 of the housing section 51, as illustrated in FIG. 9. The housing section 51 is then aligned with and pressed toward the housing section 52 and the curved edge 56 is rolled over the edge of the housing section 51 to attach the housing sections together. The peripheral edge 55 of the diaphragm in this manner is compressed between the peripheral ends of the housing sections. Before the application of air pressure to the inner chamber 53 and while the spring 72 is caged, a circumferentially extending loop 368 is formed in the diaphragm due to the extra length of the wall 362. When air pressure is applied to the inner chamber 53, the diaphragm wall 362 is forced against the wall of the chamber 52 to form the circumferentially extending loop portion 360.

Figure 12:
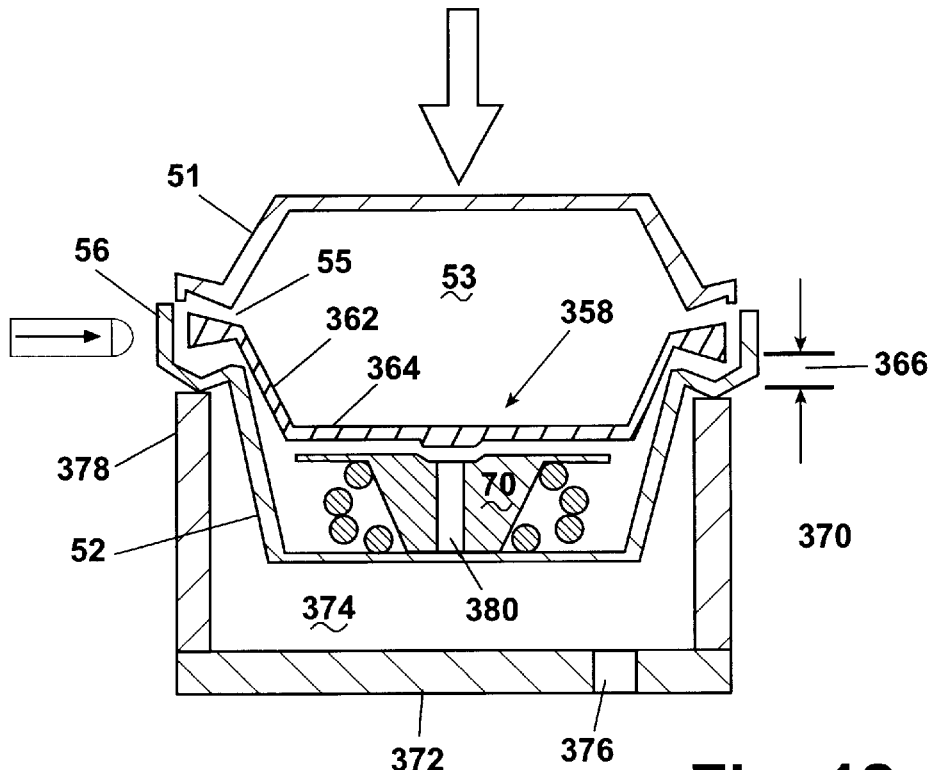
FIGS. 12 and 13 show a second method of assembling a spring brake actuator with an enlarged diaphragm according to the invention.
Figure 13:
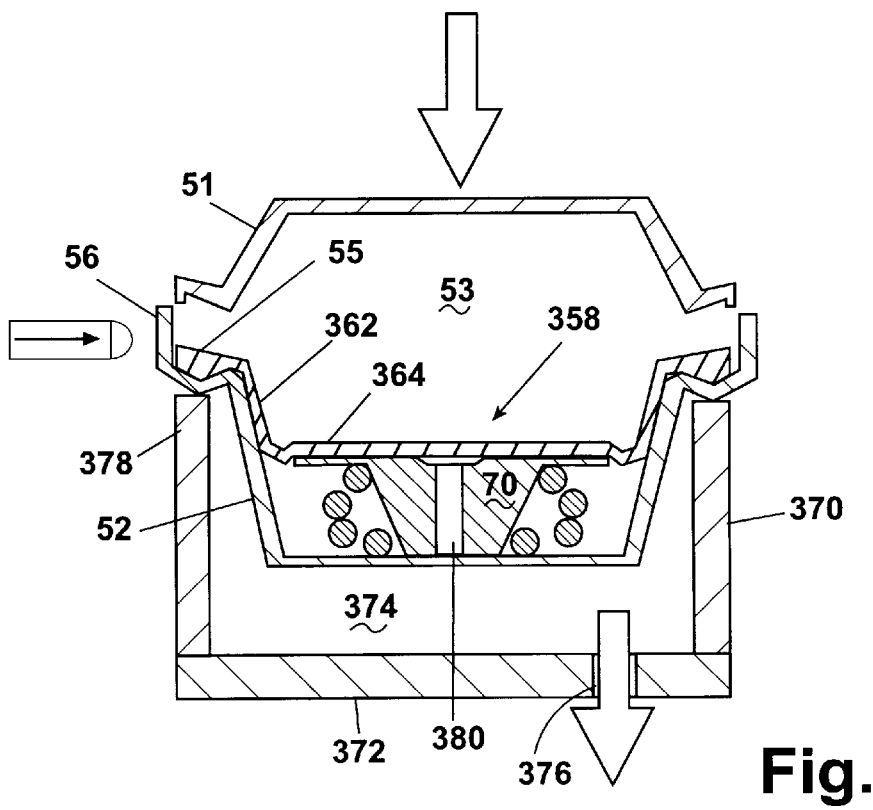

With reference now to FIGS. 12 and 13, an alternate technique for installing the diaphragm 358 having the elongate peripheral wall 362 in FIGS. 9–11 is illustrated, wherein like parts in the previous embodiments are represented by like numerals. A vacuum chamber 374 includes a circumferentially extending wall 370 attached to a floor 372. An aperture 376 extends through the floor and is adapted for connection to a vacuum source (not shown). The housing section 52 is supported on the wall 370. A sealing ring 378, preferably constructed of rubber, extends from the wall 370 and contacts the housing 52. The engagement portion 364 of the diaphragm 358 is positioned on the flat portion 73 of the pressure plate 70 in the housing section 52. Due to the length of the wall 362, as in the previous embodiment, a gap 366 exists between the peripheral edge 55 of the diaphragm 358 and the peripheral curved edge 56 of the housing section 52, as illustrated in FIG. 12. A vacuum is then applied to the chamber 374 and the diaphragm 358 through conventional weep holes (not shown) in the housing section 52 and/or a caging bolt bore 380 extending through the pressure plate 70. The vacuum pressure urges the diaphragm 358 against the inner walls of the housing section 52 and the flat portion 73 of the pressure plate 70 to close the gap 366 and form the peripherally extending loop 360. The housing section 51 is then aligned with and pressed toward the housing section 52 and the curved edge 56 is rolled over the edge of the housing section 51 to attach the housing sections together. The peripheral edge 55 of the diaphragm in this manner is compressed between the peripheral ends of the housing sections. When the vacuum is cut off from the chamber 374, the diaphragm 358 will tend to form a loop portion 368, as shown in FIG. 10, before the application of air pressure to the inner chamber 53 and while the spring 72 is caged. When air pressure is applied to the inner chamber 53, the wall 362 is forced against the inner wall of the housing section 52 to form the circumferentially extending loop portion 360.

Figure 14:
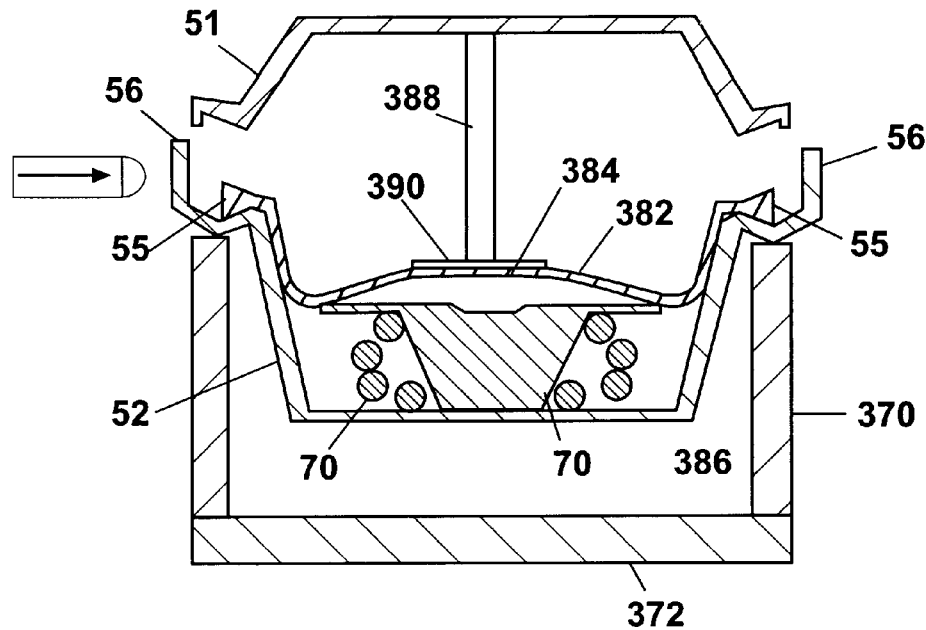
FIGS. 14 and 15 show a modified diaphragm and a third method of assembling the diaphragm to a spring brake actuator according to a further embodiment of the invention.
Figure 15:
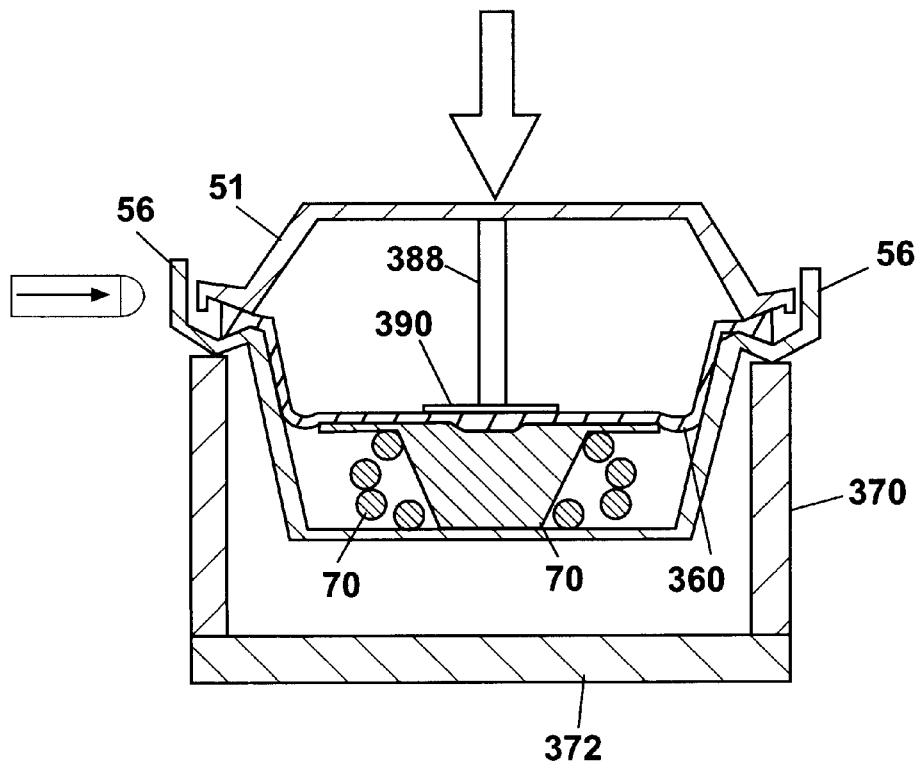

Turning now to FIGS. 14 and 15, a further diaphragm construction and method of assembling the spring brake portion 314 of FIG. 6 will now be described, wherein like elements in the previous embodiments are represented by like numerals, it being understood that the same description can apply to the spring brake portion 414 of FIG. 7. As an alternative to the diaphragm 358 being molded with a loop portion 360 or an elongated peripheral wall 362, the pressure plate engagement portion 364 may be formed with a diameter that is longer than the prior art engagement portion. The elongated engagement portion 364 forms a dome 382 that peaks at a center section 384 of the diaphragm and engages the pressure plate 70 at a periphery 386 thereof. As in the previous embodiments, the center section 384 may be solid or formed with an aperture (not shown), depending on the type of spring brake being assembled.

During assembly, the engagement portion 364 is positioned such that the periphery 386 is supported by the flat portion 73 of the pressure plate 70 and the peripheral edge 55 is supported on the peripheral curved edge 56 of the housing section 52. A push rod 388 has an adapter plate 390 at one end and extends through an aperture in the housing section 51 to thereby reciprocate between the spring brake portion 14 and the service brake portion 12 in a well known manner. The housing section 51 is then aligned with the housing section 52 with the adapter plate 390 in contact with the dome 382. The housing section 51 and push rod 388 are then pressed toward the housing section 52 until the dome rests substantially flat against the flat portion 73 of the pressure plate 70 and the peripheral edge 55 is sandwiched between the housing sections. The curved edge 56 is then rolled over the edge of the housing section 52 to attach the housing sections together. The peripheral edge 55 of the diaphragm in this manner is compressed between the peripheral ends of the housing sections. A circumferentially extending loop 360 is thus formed without the application of air pressure to thereby increase the effective surface area over which the air pressure can act.

While the invention has been described with reference to its preferred embodiment, it will be understood by those skilled in the art that various changes may be made and equivalents may be substituted for elements thereof without departing from the true spirit and scope of the invention. For example, although the diaphragm in the service brake housing has been shown and described separately from the diaphragm in the spring brake housing, the use of enlarged diaphragms in both housings is contemplated. Moreover, the circumferentially extending channels in one or both housings may be used with the enlarged diaphragms. It is also contemplated that the diaphragm may be formed with convolutions, bulges, or any other shape to thereby increase the effective area over which the air pressure can act. It is also contemplated that increasing the diameter of the pressure plate alone or with the enlarged diaphragm will increase the effective area.

I claim:

1. In a spring brake actuator comprising:

a housing having first and second housing sections defining a housing interior, the first housing section having an aperture therethrough;

a support plate located in the housing interior and being movable between retracted and extended positions relative to the housing;

a spring disposed between the second housing section and a first surface of the support plate for biasing the support plate to the extended position;

an actuator rod operably connected to the support plate for reciprocating movement with the support plate relative to the housing, the actuator rod having a first end extending through the aperture in the first housing section, and the actuator rod being sized relative to the housing aperture to guide the reciprocating movement of the actuator rod;

a flexible diaphragm abutting a second surface of said support plate opposite said first surface and dividing the housing interior into a first chamber and a second chamber, the diaphragm having a surface exposed to fluid pressure to thereby force said support plate and actuator rod to the retracted position against the bias of said spring;

the improvement comprising:

said diaphragm including an elongate portion that forms a loop when said support plate is in the retracted position to thereby increase the effective surface area over which the fluid pressure acts as the support plate moves from the extended position to the retracted position.

2. A spring brake actuator according to claim 1 wherein said diaphragm has an outer peripheral edge that is clamped between said first and second housing sections and a center section that abuts said second surface of said support plate.

3. A spring brake actuator according to claim 2 wherein said elongate portion of said diaphragm is located between said peripheral edge and said center section.

4. A spring brake actuator according to claim 2 wherein said elongate portion of said diaphragm forms part of said center section.

5. A spring brake actuator according to claim 4 wherein said center section is dome-shaped before installation of said diaphragm in the housing and the center section is pushed against the support plate by the actuator rod when the diaphragm is installed in the housing to form said loop adjacent to the center section.

6. A spring brake actuator according to claim 5 wherein said loop extends circumferentially between an outer peripheral edge of the support plate and an inner surface of the housing.

7. A spring brake actuator according to claim 1 wherein said loop extends circumferentially between an outer peripheral edge of the support plate and an inner surface of the housing.

8. A spring brake actuator according to claim 7 wherein said second housing section includes an inner circumferentially extending channel that is adapted to receive at least a portion of said loop when the support plate is in the retracted position and fluid pressure is acting against said diaphragm.

9. In a brake actuator for a vehicle comprising:

a service brake actuator housing and a spring brake actuator housing, each having an interior space;

a first movable diaphragm disposed within the spring brake actuator housing dividing the interior space thereof into a first spring brake actuator chamber and a second spring brake actuator chamber;

a second movable diaphragm disposed within the service brake actuator housing dividing the interior space thereof into a first service brake actuator chamber and a second service brake actuator chamber; and an actuator rod operably connected to the first movable diaphragm and movable therewith for reciprocation between a first retracted position wherein the actuator rod is essentially within the interior space of the spring brake actuator housing and a second extended position wherein the actuator rod extends into the interior space of the service brake actuator housing;

the improvement comprising:

said first movable diaphragm including an elongate portion that forms a loop when said actuator rod is in the retracted position to thereby increase the effective surface area over which the fluid pressure acts as the actuator rod moves from the extended position to the retracted position.

10. A brake actuator according to claim 9 wherein said first movable diaphragm has an outer peripheral edge that is clamped between first and second housing sections of said spring brake actuator housing and a center section that abuts an inner end of said actuator rod.

11. A brake actuator according to claim 10 wherein said elongate portion of said diaphragm is located between said peripheral edge and said center section.

12. A brake actuator according to claim 10 wherein said elongate portion of said diaphragm forms part of said center section.

13. A brake actuator according to claim 12 wherein said center section is dome-shaped before installation of the diaphragm in the spring brake actuator housing and the center section is pushed against a support plate located in the spring brake actuator housing by the actuator rod when the diaphragm is installed in the housing to form said loop adjacent to the center section.

14. A brake actuator according to claim 13 wherein said actuator rod is attached for reciprocal movement to a support plate located in the spring brake actuator housing, and wherein the loop extends circumferentially between an outer peripheral edge of the support plate and an inner surface of the spring brake actuator housing when the actuator rod is in the retracted position.

15. A brake actuator according to claim 9 wherein said actuator rod is attached for reciprocal movement to a support plate located in the spring brake actuator housing, and wherein the loop extends circumferentially between an outer peripheral edge of the support plate and an inner surface of the spring brake actuator housing when the actuator rod is in the retracted position.

16. A brake actuator according to claim 15 wherein said spring brake actuator housing includes an inner circumferentially extending channel that is adapted to receive at least a portion of said loop when the support plate is in a retracted position and fluid pressure is acting against said first movable diaphragm.

17. A brake actuator according to claim 9 and further comprising a push rod that has an inner end in contact with said second movable diaphragm in the interior of the service brake actuator housing and an outer end that extends from the service brake actuator housing; and wherein said second movable diaphragm includes an elongate portion that forms a loop when said push rod is in the extended position to thereby at least maintain the effective surface area over which the fluid pressure acts as the push rod moves from the retracted position to the extended position.

18. A brake actuator according to claim 17 wherein the second movable diaphragm has an outer peripheral edge that is clamped between first and second housing sections of said service brake actuator housing and a center section that abuts the inner end of said push rod, and wherein said elongate portion of said second movable diaphragm is located between said peripheral edge and said center section.

19. A brake actuator according to claim 17 wherein said push rod is attached for reciprocal movement to a pressure plate located in the service brake actuator housing, and wherein the loop extends circumferentially between an outer peripheral edge of the pressure plate and an inner surface of the service brake actuator housing.

20. A brake actuator according to claim 19 wherein said service brake actuator housing includes an inner circumferentially extending channel that is adapted to receive at least a portion of said loop when the pressure plate is in an extended position and fluid pressure is acting against said second movable diaphragm.

21. In a fluid-operated brake actuator comprising:

a housing having first and second housing sections defining a housing interior;

a flexible diaphragm spanning the housing interior and dividing the housing interior into a first chamber at least partially defined by one of the housing sections and a second chamber at least partially defined by the other housing section, and one of the first and second chambers being exposed to a source of fluid pressure to thereby move the flexible diaphragm between an exhausted position and an expanded position in response to the reduction and increase of fluid pressure;

a support plate positioned within the housing in abutting relationship with the flexible diaphragm and being movable between a retracted position and an extended position relative to the housing; and the support plate being moved into one of the retracted and extended positions in response to a force applied to the support plate by the diaphragm as the diaphragm is moved from a first to a second of the exhausted and expanded positions;

a spring disposed between a first surface of the support plate and one of the housing sections for applying a force to the support plate in opposition to the force applied by the diaphragm;

an actuator rod operably connected to the support plate for reciprocating movement with the support plate relative to the housing, the actuator rod having a first end extending through an aperture in one of the housing sections, and the actuator rod being sized relative to the aperture to guide the reciprocation of the actuator rod;

the improvement comprising:

said diaphragm including an elongate portion that forms a loop when said support plate is in the retracted position to thereby increase the effective surface area over which the fluid pressure acts as the support plate moves from the extended position to the retracted position.

22. A fluid-operated brake actuator according to claim 21 wherein said diaphragm has an outer peripheral edge that is clamped between said first and second housing sections and a center section that abuts a second surface of said support plate.

23. A fluid-operated brake actuator according to claim 22 wherein said elongate portion of said diaphragm is located between said peripheral edge and said center section.

24. A fluid-operated brake actuator according to claim 22 wherein said elongate portion of said diaphragm forms part of said center section.

25. A fluid-operated brake actuator according to claim 24 wherein said center section is dome-shaped before installation of said diaphragm in the housing and the center section is pushed against the support plate by the actuator rod when the diaphragm is installed in the housing to form said loop adjacent to the center section.

26. A fluid-operated brake actuator according to claim 25 wherein said loop extends circumferentially between an outer peripheral edge of the support plate and an inner surface of the housing.

27. A fluid-operated brake actuator according to claim 21 wherein said loop extends circumferentially between an outer peripheral edge of the support plate and an inner surface of the housing.

28. A fluid-operated brake actuator according to claim 27 wherein said second housing section includes an inner circumferentially extending channel that is adapted to receive at least a portion of said loop when the support plate is in the retracted position and fluid pressure is acting against said diaphragm.

29. A fluid-operated brake actuator according to claim 21 wherein the first chamber is exposed to the source of fluid pressure and the actuator rod is in the extended position when the diaphragm is in the expanded position.

30. A fluid-operated brake actuator according to claim 21 wherein the second chamber is exposed to the source of fluid pressure and the actuator rod is in the retracted position when the diaphragm is in the expanded position.

* * * * *